(12) United States Patent
Ahlström (10) Patent No.: US 11,475,060 B2
(45) Date of Patent: Oct. 18, 2022

(54) SYSTEM AND METHOD FOR VOTING ON MEDIA CONTENT ITEMS

(71) Applicant: Spotify AB, Stockholm (SE)

(72) Inventor: Mattias Ahlström, Stockholm (SE)

(73) Assignee: Spotify AB, Stockholm (SE)

( * ) Notice: Subject to any disclaimer, the term of this patent is extended or adjusted under 35 U.S.C. 154(b) by 181 days.

(21) Appl. No.: 16/129,186

(22) Filed: Sep. 12, 2018

(65) Prior Publication Data

US 2020/0082020 A1 Mar. 12, 2020

(51) Int. Cl.
*G06F 16/64* (2019.01)
*G06F 16/635* (2019.01)
*G06F 16/638* (2019.01)
*G06F 16/68* (2019.01)

(52) U.S. Cl.
CPC ............ *G06F 16/64* (2019.01); *G06F 16/635* (2019.01); *G06F 16/639* (2019.01); *G06F 16/686* (2019.01)

(58) Field of Classification Search
CPC ...... G06F 16/639; G06F 16/64; G06F 16/686; G06F 16/635
See application file for complete search history.

(56) References Cited

U.S. PATENT DOCUMENTS

| 8,825,668 | B2 | 9/2014 | Yadav et al. |
| 2009/0055376 | A1 | 2/2009 | Slaney et al. |
| 2010/0228740 | A1 | 9/2010 | Cannistraro et al. |
| 2013/0191454 | A1* | 7/2013 | Oliver ................... G06F 16/639 709/204 |
| 2013/0340016 | A1* | 12/2013 | Parekh ................. H04N 21/812 725/109 |
| 2015/0220525 | A1* | 8/2015 | Ross ....................... G06F 16/00 707/737 |
| 2015/0242750 | A1* | 8/2015 | Anderson .......... G06Q 30/0631 706/50 |
| 2017/0337761 | A1* | 11/2017 | Dunnington ....... G06Q 30/0201 |
| 2018/0341704 | A1* | 11/2018 | Barkan ................. G06F 16/637 |
| 2020/0004495 | A1* | 1/2020 | Dundar ............... G06F 16/4387 |

FOREIGN PATENT DOCUMENTS

WO 2006/093980 A3 9/2006

OTHER PUBLICATIONS

Chen, Y. (2010). Exploratory Browsing: Enhancing the Browsing Experience with Media Collections. Ludwig-Maximilians—Universität München.

* cited by examiner

*Primary Examiner* — James Trujillo
*Assistant Examiner* — J Mitchell Curran
(74) *Attorney, Agent, or Firm* — Merchant & Gould P.C.

(57) ABSTRACT

Methods, systems, and computer programs for generating a queue of media content items to be played in a party setting are described. A first seed track is identified and is used to create a plurality of related media content items that are presented to a plurality of voters. The media content item receiving the most votes is placed in the queue and subsequently played.

15 Claims, 8 Drawing Sheets

SYSTEM AND METHOD FOR VOTING ON MEDIA CONTENT ITEMS

BACKGROUND

In group settings there is often a desire to listen to music that everyone enjoys. However often one person controls the music. That person may or may not take into consideration others' opinions about what to play. For example, U.S. Pat. No. 8,825,668, titled "Method and apparatus for updating song playlists based on received user ratings" describes a method for updating song playlists based on received rating inputs from user devices. U.S. Patent Pub. No.: 2010/0228740 titled "Community playlist management" describes a system that communicates with a plurality of portable devices to transmit information about the items in the playlist, and users of the portable device queue can vote on items in the playlist.

Different types of platforms allow voters to cast votes. Some example electronic or online platforms allow a host to present, for example, a question on a display screen. Voters can in turn, electronically cast their votes as to the correct answer by, for example, using a keyboard, touchscreen, or dial pad.

However, there is currently no known platform that provides a host with a mechanism that presents options related to the selection of media content items, such as music, where the choices of songs presented to voters are selected intelligently based, in part, on criteria relevant to the host and the very same users casting the votes. This would be especially desirable in a party setting, where traditionally a host or one guest selects all of the songs to be played, even if the rest of the guests disagree. This is additionally desirable in situations where the voters are not all physically located in the same location, and/or where communication between locations is limited.

A related technical problem involves the amount of processing time and resources required by existing audio players and media distribution platforms to obtain alternative media content items. Existing techniques typically wait for a user to provide a request and then process the request. Similarly, existing techniques unnecessarily use too many resources to filter out media content items that are not desired rather than affirmatively selecting media content items that are predicted to be appropriate for a queue or playlist. The more an operator must monitor the queue, the less time that operator (or user) has to enjoy other things they are doing, such as hosting a party. Yet another technical problem is that while the media content items may be tagged with metadata, nothing in such metadata relates to user activity related to such media content items. Thus further increasing the media player and/or media distribution platform's ability to efficiently and correctly select relevant media items to be played back.

SUMMARY

The present system and method provides a solution to the above technical problems by generating a queue of media content items based on a number of votes received.

In general terms, the present disclosure is directed to a system and method for creating a queue of media content items based on the votes of a plurality of people. The queue starts with a seed media content item, such as a track, and continues by providing a set of related media content items for people to vote on.

In a first embodiment, a method of creating and playing a queue of one or more media content items is described. The method includes receiving a seed media content item; determining a plurality of related media content items based at least on the seed media content item; displaying on at least one display, a plurality of selectable graphical images representing the plurality of related media content items, correspondingly; receiving from each of a plurality of devices, a communications message containing a vote corresponding to a media content item selected from the plurality of related media content items; tallying a plurality of votes received form the plurality of devices; selecting a predetermined number of media content items from the plurality of related media content items based on the plurality of tallied votes; putting in a queue one or more of the predetermined number of media content items; and playing at least one of the predetermined number of media content items in the queue on one or more media playback devices.

In another embodiment, a system includes a non-transitory memory and a processing device coupled to the memory and constructed to execute the process steps stored in the memory, where the stored process steps include steps which when executed by the processor cause the processor to perform the following steps. The steps include: receiving a seed media content item; determining a plurality of related media content items based at least on the seed media content item; displaying on at least one display, a plurality of selectable graphical images representing the plurality of related media content items, correspondingly; receiving from each of a plurality of devices, a communications message containing a vote corresponding to a media content item selected from the plurality of related media content items; tallying a plurality of votes received form the plurality of devices; selecting a predetermined number of media content items from the plurality of related media content items based on the plurality of tallied votes; putting in a queue one or more of the predetermined number of media content items; and playing at least one of the predetermined number of media content items in the queue on one or more media playback devices.

DETAILED DESCRIPTION

Various embodiments will be described in detail with reference to the drawings, wherein like reference numerals represent like parts and assemblies throughout the several views.

The example embodiments described herein provide systems, methods and computer products that provide a host with a mechanism that presents options related to the selection of music, where the choices of tracks presented to voters are selected intelligently based, in part, on criteria relevant to the host and the very same users casting the votes. This description is not intended to limit the application to the example embodiments presented herein. In fact, after reading the following description, it will be apparent to one skilled in the relevant art(s) how to implement the following example embodiments in alternative embodiments (e.g., in domains outside of media recommendation).

In an example embodiment, a seed track is first identified. The seed track may be selected by a user or the application. In turn, a plurality of related tracks are identified based on similarity between artist, genre, user listening history, theme, etc. A track can be a media content file, a track identifier representing the track, and the like (so when a queue or playlist is displayed, the track is a link to a stored file or a track ID that is sent to a remote server that causes the remote server to stream data). A plurality of graphical images representing the plurality of related tracks is displayed on at least one display. Communications messages containing a vote corresponding to a track are received by the system. The system tallies the votes received and puts the winning tracks in queue to be played later. In an embodiment, each time a new track is played, the next options may be based on the currently played song (the new seed track), instead of the original seed track.

The system and method are generally directed towards procuring and generating a list of media content items that are based on a seed media content item. As described herein, consuming media content items may include one or more of listening to audio content, watching video content, or consuming other types of media content. For ease of explanation, the embodiments described in this application are presented using specific examples. For example, audio content (and in particular music) is described as an example of one form of media consumption, and examples commonly refer to "songs" or "tracks" are representative of a media content item. This system provides a way of either playing a track or creating a queue composed of songs receiving a minimum number of votes from a plurality of people.

Media content items may include audio and video content. Examples of audio content include songs, albums, playlists, radio stations, podcasts, audiobooks, and other audible media content items. Examples of video content include movies, music videos, television programs, and other visible media content items. In many cases, video content also includes audio content.

Many users desire personalized media consuming experience, even when in a group setting. For example, a user can access almost limitless catalogs of media content items through various free or fee-based media delivery services, such as media streaming services. Users can use mobile devices or other media playback devices to access large catalogs of media content items. Due to such large collections of media content items, it is desired to make it possible to customize a selection of media content items to fit well with a plurality of users' desire to help select media content items in a party environment.

Figure 1:
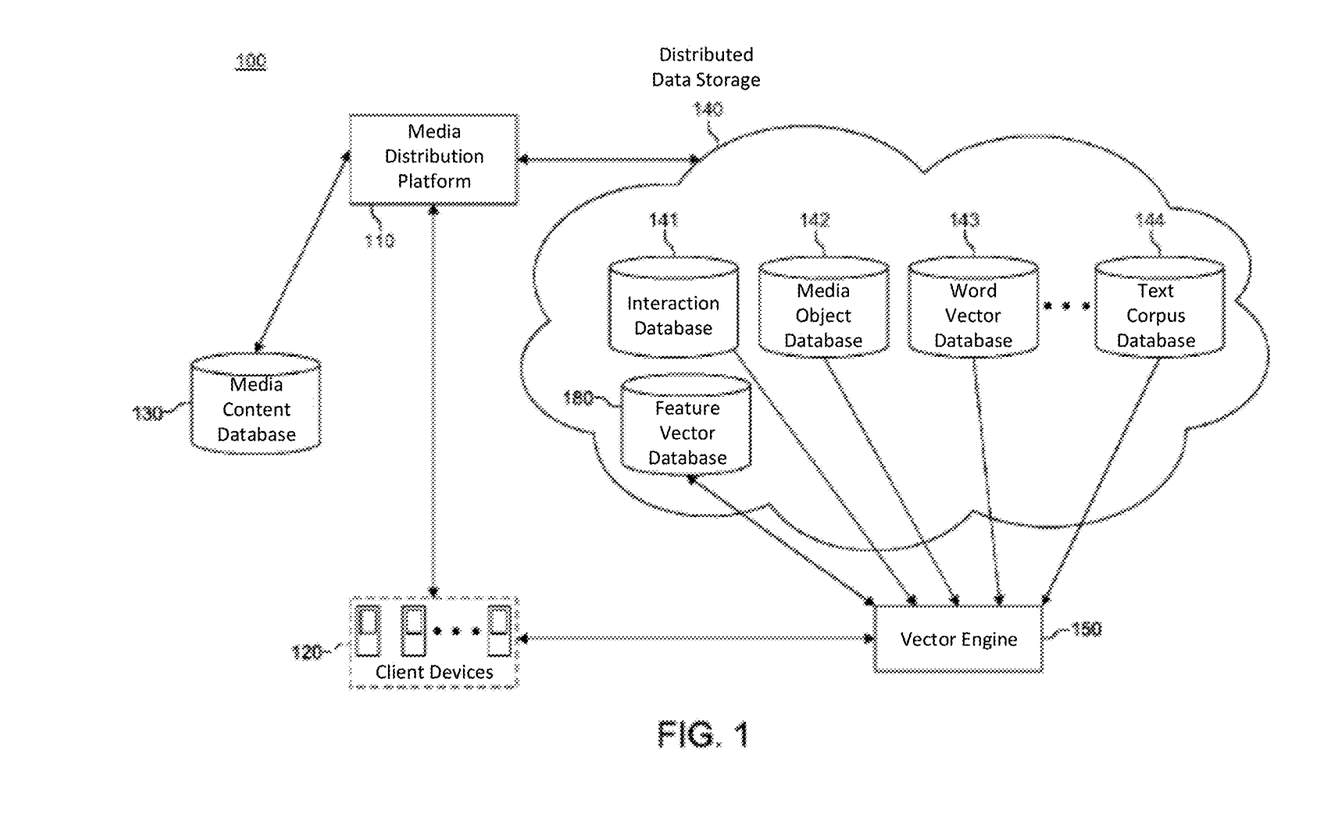
FIG. 1 is an architectural overview of a system for carrying out the method described herein.

FIG. 1 is an architectural overview of a system 100 for recommending media content items based on a specified seed media content item according to an example embodiment.

Media distribution platform 110 is a platform for distributing digital media content to end-users on client devices 120 each client device communicatively coupled to media distribution platform 110. Media distribution platform 110 may deliver a variety of media objects, including, but not limited to songs, audiobooks, podcasts, videos, movies and TV shows. Media content items are stored in the form of media files in media content database 130 communicatively coupled to media distribution platform 110. Media distribution platform 110 may distribute media content items to client devices 120 as downloadable objects (i.e. media files), live streaming objects (e.g. radio stations or video channels), on-demand streaming media, and so forth. Media distribution platform 110 may also deliver media-related applications and services to client devices 120. Media distribution platform 110 is able to store and retrieve data from distributed data storage 140.

Client devices 120 are computer hardware and/or software that allow an end-user to access and interact with the media content and services made available by media distribution platform 110. Client devices 120 access the media stored in the media content database 130 and the data of distributed data storage 140 through the media distribution platform 110.

Media content database 130 stores a catalog of media content items in the form of media files, as well as metadata associated with the media content items, such as song or video titles, artist names, song or video durations, associated album titles, and associated album art.

Distributed data storage 140 stores data used by and collected from media distribution platform 110. Distributed data storage 140 may be a distributed file system such as, for example, any known or future known distributed file system and associated software framework such as an Apache Hadoop Distributed File System (HDFS) (i.e. "Hadoop Cluster") and the Apache MapReduce framework. Data from distributed data storage 140 may be queried or processed using a cluster-computing framework such as Apache Spark. Examples of data stored in distributed data storage 140 include, but are not limited to, interaction database 141, media object database 142, word vector database 143, text corpus database 144, and feature vector database 180.

Interaction database 141 includes data collected from interactions performed by end-users on media distribution platform 110 (e.g. songs or videos played, playlists created, applications executed, etc.). These interactions can be performed, for example, using one of client devices 120 and may be collected into interaction histories (e.g. media sessions, or viewing and listening histories). Interaction histories are data structures that contain metadata corresponding to media objects from media content database 130 that an individual user has interacted with over a time period. This metadata can include, for example, media content identifiers for each of the media content items. Media content identifiers can be alphanumeric characters or other representations that, when processed, link metadata to an associated media content item. Interaction histories can be used to provide personalized media recommendations to end-users, for example, by maintaining a taste profile for each end-user based on analysis of the interaction histories.

Media object database 142 are data structures that contain metadata associated with a finite set of media content items (e.g. a music or video playlist, a saved favorites list or a media queue). The media object database 142 can be user-generated at individual ones of client devices 120 (as described in more detail with respect to FIG. 3 below), automatically generated, or curated by an editorial staff.

Word vector database 143 include numerical vector representations of words and phrases (i.e. word embedding).

They represent words in an n-dimensional space, each dimension quantifying a latent feature of the words based on co-occurrences of the words in a text corpus, such as a collection of documents, articles, or books. Word vector database 143 can be created and processed by neural networks to group similar words based on context and to perform mathematical calculations on words. In the example embodiments described herein, word vector database 143 can include pre-trained word or phrase vectors, for example those made publicly available as part of the Google Word2Vec toolset (https://code.google.com/p/word2vec/).

Text corpus database 144 includes training text data that can be inputted into a neural network or vector encoding toolset (e.g. a vector model) to generate word vectors. Text corpus data may include any type of document or paragraph containing words in a useful context. For example, the text corpus data may include books, encyclopedia entries, or news articles. In other examples, the text corpus data may include text from media-related editorial content such as music or film related reviews, news articles, or social media commentary. This media-related editorial content can, for example, be periodically scraped from the web.

Vector engine 150 includes a trainable neural network that generates feature vectors for various objects and performs mathematical computations on the generated feature vectors. The neural network, for example, implements known or future known algorithms or toolsets such as a vector model toolset and modifications thereof. As described more fully below with respect to FIG. 3, in addition to using word vector database 143 and text corpus database 144, vector engine 150 can be trained using interaction database 141 and media object database 142. Vector engine 150 can initialize latent feature vectors for words, individual media object lists, individual media content items, and individual interaction histories. Mathematical computations, such as computational nudging, can be performed on the feature vectors based on co-occurrences of media content items in the media content lists, co-occurrences of media content items or media content lists in interaction histories, or co-occurrences of words in the titles of the media content lists or in the metadata associated with the media content items. Once trained, vector engine 150 is able to recommend media content items by performing additional computations on the various feature vectors, for example, by calculating cosine similarities between the feature vectors.

Feature vector database 180 stores feature vectors generated by vector engine 150. The feature vectors can be periodically updated through computations performed by vector engine 150 based on new contexts (i.e. new co-occurrences of objects corresponding to the feature vectors). The stored feature vectors may also be accessed and used by other applications external to vector engine 150.

Figure 2:
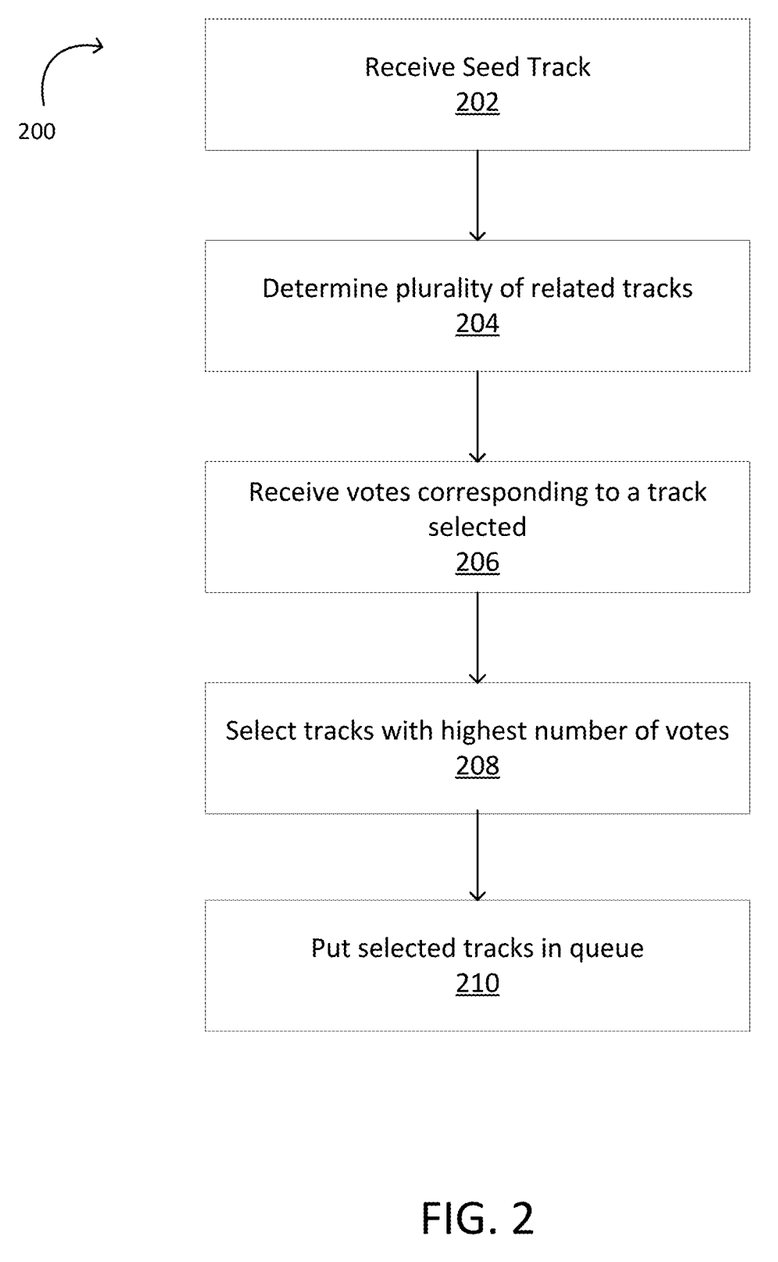
FIG. 2 is an example method for creating and playing a queue of one or more media content items.

FIG. 2 illustrates an example method 200 of generating a list of tracks to present to a number of users and to receive votes for each for each of the tracks to create a queue of tracks. It should be noted that tracks might refer to any type of media content item. It should be noted that throughout the specification, tracks are used as an example of media content items; however, this is not to be seen as limiting. At a first step 202, a seed media content item, such as a track is received. A seed track is any track selected by the host, or alternatively may be selected by the system.

The system may select a track based on a variety of factors, such as the time of day, the type of party or event, the date (such as a Holiday), or the location. For example, if a party takes place on December 25$^{th}$, then the system may choose a Christmas-themed seek track. In another example, if a party takes place in the morning, the system may choose a relaxing seek track.

At step 204, a plurality of related tracks are determined. The plurality of related tracks are identified based on similarity between artist, genre, at least one voter's listening history, theme, etc. To find related tracks, a variety of different methods may be used. In an example method, a vector model is created. The model may contain tracks that appear in the same playlists as the seed track. The model may also contain tracks that appear in the same album as the seed track. The model uses playlists created by all users in the voting party, attempting to uncover latent structure in millions of combinations of tracks.

At least some of the playlists may include user-created playlists. For example, a user of a media streaming service can create a playlist or a playlist can be created and/or edited by a group of users together to make it a collaborative playlist. In some embodiments, user-created playlists can be available to a particular user only, a group of users, or to the public based on a user-definable privacy setting.

In addition or alternatively, at least some of the playlists are created by a media streaming service provider. In some embodiments, a provider-created playlist can be customized to a particular user or a particular group of users. By way of example, a playlist for a particular user can be automatically created based on the listening history of the user (e.g., the taste profile of the user) and/or listening history of other users with similar tastes. In other embodiments, a provider-created playlist can be configured to be available for the public in general. Provider-created playlists can also be sharable with to other users.

Figure 5:
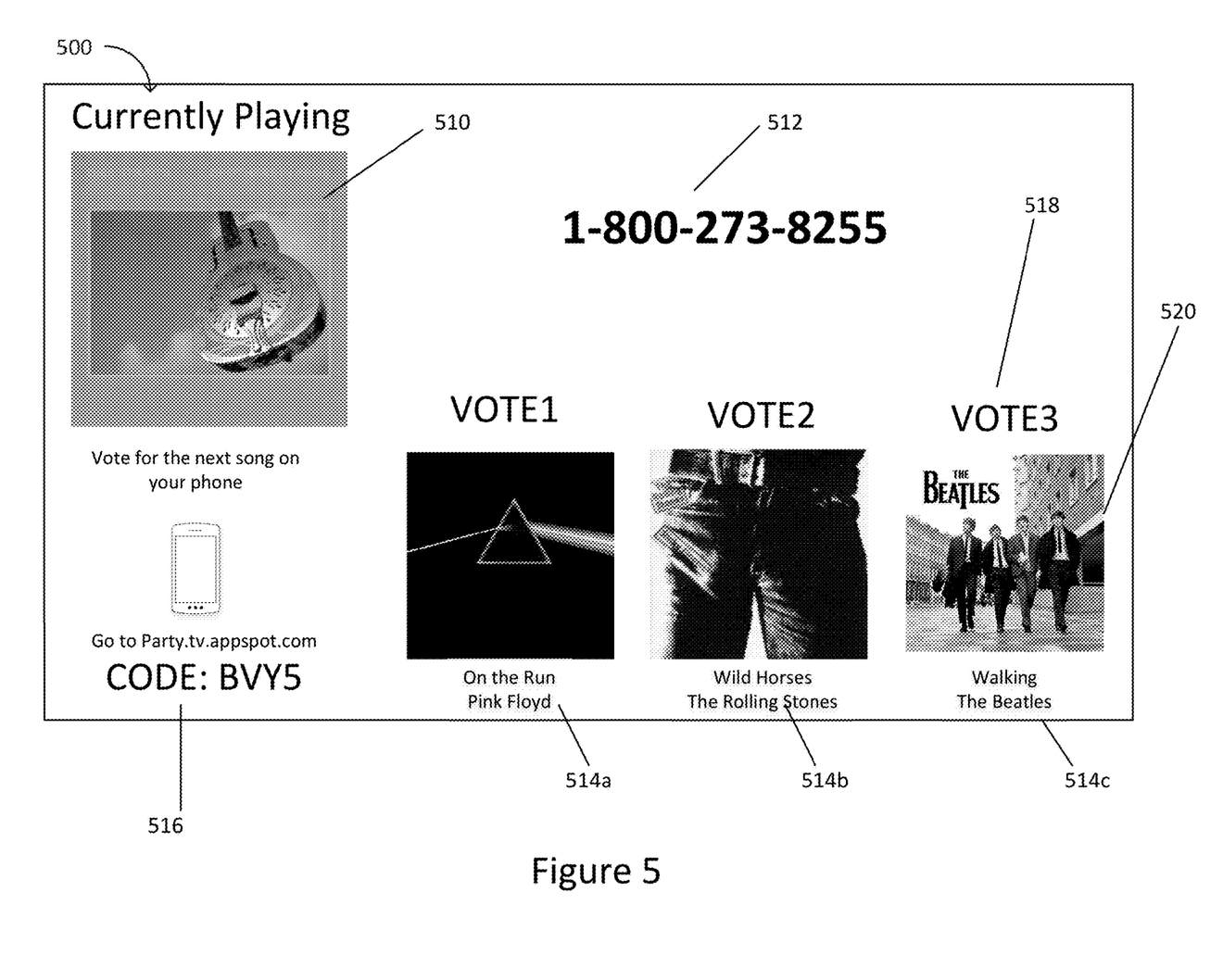
FIG. 5 illustrates an example embodiment of a display for a voting application according to an example embodiment.

The tracks are then filtered based on the cosine distance to the seed track. A list of tracks is created in order of higher cosine values to lower cosine values. The tracks with the highest cosine value are presented to the users who are voting (herein referred to as voters). However, it should be noted, that not only the tracks with the highest cosine value are presented. Tracks having a cosine value above a predetermined threshold may be presented to voters. An example embodiment of a user interface with a list of tracks to be presented for voting is shown in FIG. 5 and described below. At least two tracks are presented to the voters, for example, three tracks are presented to the voters. In an example, no more than four tracks are presented to the voters.

At step 206, votes are received by the system. The votes are cast by a plurality of users, each user associated with a unique user ID. It should be noted that throughout the specification, users associated with user ID's are often referred to as voters. Voters are presented with at least two different tracks to vote on. In an example embodiment, three different tracks are presented for voters to vote on. Votes may be received through a number of different methods. In a first embodiment, voters may call a number and vote using a touch-tone telephone. Voters call the number and may listen to a script that assigns a number to track, and the user enters the number assigned to the track that they want to vote for. Alternatively, voters may vote using a number, wherein the number has been previously assigned as shown on the user interface.

In another embodiment, voters can vote using a short message service (SMS). The same or a different phone number may be presented on the user interface for voting. Alternatively, a short code is presented for voting. The user interface assigns a number, word, or phrase that is assigned to a track. The voters enter the number, word, or phrase to vote for a particular track.

In yet another embodiment, voters can vote using a quick response code ("QR code"). The user interface displays the QR code, which the voters scan using an associated application. In an example embodiment, the voter scans the QR code, which then allows voters to vote for a track. The QR code directs the mobile device of the user to a website or application, where the plurality of tracks for voting are displayed.

In yet another embodiment, voters can vote using a media streaming application. The voters log into the media streaming application, where they are prompted to enter their user ID, and select "Party Voting." In the party voting application, the voter is presented in real time with the list of tracks to be voted on. The voter selects on their mobile device, for example, which track they would prefer to hear next.

The system may receive one vote per grouping of tracks, and do not receive any additional votes cast by the same voter (or user ID). Alternatively, the system may receive more than one vote during each grouping of tracks per voter. For example, a voter may vote twice, or even an unlimited number of times. Still further, the system receives a weighted vote from a predetermined voter (or user ID). A weighted vote may be worth the same value as multiple votes, such as 10 votes. Weighted votes may be allocated to certain user ID's, such as the user who has initiated the party (hereinafter referred to as the "host"). Still further, the host may assign at least one other voter with a weighted vote.

At step 208, the tracks with the highest number of votes are selected. Generally, while each track is being played, at least two other tracks are presented as options for voters to vote on. The tracks receiving the highest number of votes are collected to be played later and are placed in a queue. In an example embodiment, only the track receiving the most votes in each set of presented tracks is played. In another embodiment, an aggregate of tracks receiving the highest number of votes are played.

As described, in an embodiment, only the track with the highest number of votes within each group of tracks is selected. In another embodiment, tracks receiving a minimum number of votes are selected. For example, the system or host may select a minimum voting value as 40% of the votes. More than one track may receive the minimum number of votes per grouping of tracks. Alternatively, no tracks may receive the minimum number of votes, in which case a new grouping of tracks is presented.

More than one grouping of tracks may be presented during the length of a currently playing track. This allows for a queue of tracks to be created. Each grouping may be presented for a predetermined period of time, for example, two minutes. In an alternative embodiment, one group of tracks is presented during a currently playing track.

At step 210, the selected tracks, e.g., the tracks receiving the highest number of votes are placed in a queue. Then the tracks in the queue are played. The tracks may be played in the order in which they were placed in the queue. Alternatively, the tracks in the queue may be shuffled before being played.

In an example embodiment, the system may be able to remove a track, even after it has been selected. Alternatively, the host may be able to remove a selected track. For example, the system may remove tracks with explicit content, even if that track received the required number of votes. In another example, the system may remove a track that does not fit the theme of a party, for example, a track with too few beats per minute may be removed from a dance party.

Briefly, in FIG. 1, corpus data from distributed data storage 140 is input into vector engine 150. Vector engine 150 initializes feature vectors, each feature vector representing an object from the corpus data. The vector engine 150 nudges the feature vectors based on co-occurrences of the objects in the corpus data and then stores the feature vectors in feature vector database 180. Client device 120 then detects that a user desires to utilize "party voting" and vector engine 150 identifies a feature vector among the feature vectors stored in feature vector database 180 associated with the seed track. Vector engine 150 then calculates cosine similarities between the feature vector associated with the seed track and other feature vectors stored in feature vector database 180. The calculated cosine similarities define similarities and differences between the objects and can then be used by the vector engine 150 to select a media content item or a media content list and/or recommend a media content item or media content list to a user.

Figure 3:
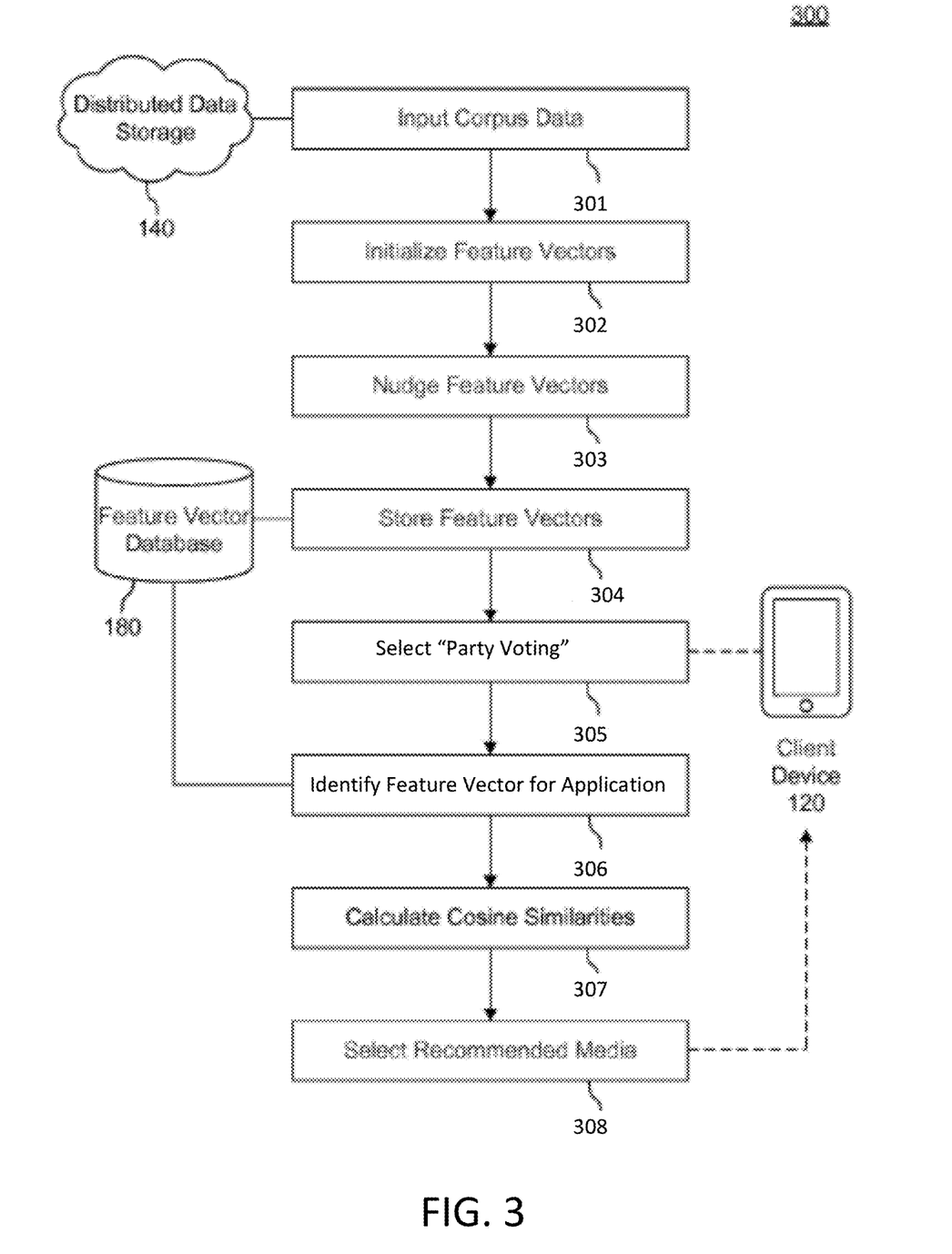
FIG. 3 is a flow diagram for explaining a process for using a party voting application according to an example embodiment.

In more detail, shown in FIG. 3, in step 301, corpus data is inputted into vector engine 150 in order to train vector engine 150 on the contexts that relate or differentiate various objects. The corpus data may be collected, for example, from distributed data storage 140 and may include media object database 142, each media object database 142 containing metadata associated with a plurality of media content items stored in media content database 130, and each media content list having a title. The media content lists may each also include or be linked to one or more tags, each tag associating a word or phrase to the respective media content list. The corpus data may also include word vector database 143 and text corpus database 144, as well as interaction database 141, including a plurality of interaction histories, each interaction history containing metadata associated with a plurality of media content items in media content database 130. The corpus data provides data on various co-occurrences of objects, for example, two media content items contained in the same media content list, a common word appearing in the titles of two different media content lists, two media content items found in the same interaction history, a word found in a title of a media content list and also appearing in a document of the text corpus data, and so forth.

In step 302, vector engine 150 includes a neural network or vector encoding toolset that initializes feature vectors for various objects in the corpus data. For example, feature vectors may be initialized for each media content list, each word in the titles of the media content lists, each word contained in the text corpus data, each tag of the plurality of media content lists, each interaction history, each media content item, and so forth. The initialized feature vectors are numerical vector representations of each media content items, each feature vector including n-dimensions each quantifying a latent feature of the media content items. In examples described herein, each feature vector is comprised of 40 dimensions, but feature vectors of any number of dimensions may be initialized. Generally speaking, a greater number of dimensions allows for increased specificity in defining the similarities and differences between media content items, but demands increased computational resources when initializing or performing computations on the feature vectors.

In step 303, vector engine 150 nudges the feature vectors based on co-occurrences of the respective media content items within the corpus data. Nudging of the feature vectors involves modifying the numerical values of the feature vectors using one or a combination of known computational algorithms including, but not limited to, gradient descent, stochastic gradient decent, Continuous Bag-of Words (CBOW), skip-gram, hierarchical soft-max or negative sampling.

In step 304, the features vectors are stored by vector engine 150 in feature vector database 180. The stored feature vectors may be routinely updated by performing additional computations on the feature vectors based on newly inputted or updated corpus data or newly identified co-occurrences between objects in the corpus data. The stored feature vectors are accessible to vector engine 150 for further computations as well as to applications and devices external to vector engine 150 such as additional applications connected to media distribution platform 110.

In step 305, a host selects the "Party Voting" application. This action can be detected by vector engine 150 or by client device 120. In one example, the host is in an environment with other listeners/viewers, where the other listeners/viewers desire to have an input into which media content items are played. When the host selects the "Party Voting" application, they may be prompted to select a seed track. Alternatively, the track that a user, such as the host, is currently listening to becomes the seed track. Still further, the system presents a series of questions relating to the party, such as theme, date, etc., for the host to answer, and the application selects a seed track based on the inputs received.

In yet another embodiment, the host may opt to join a party initiated by another host. The other host may have started a party voting application, and made the party public, wherein other hosts or users may join. Alternatively, the other host may have started a private party, wherein new or additional hosts need to be approved by the original host.

In step 306, vector engine 150 identifies, among the feature vectors stored in feature vector database 180, a feature vector corresponding to the seed track.

In step 307, vector engine 150 calculates the cosine similarities between the feature vector associated with the seed track identified in step 306 and other feature vectors stored in feature vector database 180 (i.e. the distance between the two vectors in the vector space).

In step 308, vector engine 150 sorts the computed cosine similarities to identify various media content items from the corpus data that are closest in the vector space to the application selected in step 305 and selects one or more of the objects to be recommended to an end-user, for example, through a media streaming application running on client device 120.

In an embodiment, a host selects a "Party Voting" application. The host may also be the user that picks the seed track. The seed track may be the track that is already playing on the host's application. Alternatively, the host may purposefully select a seek track.

In yet another embodiment, the "Party Voting" application selects a seed song based on a set of factors, such as the date, the time, or a selected type of party. If the "Party Voting" application is executed on Mother's Day morning, for example, the application may select a song representative of that time and event. In another example, a plurality of themes are presented, and a dance party theme is selected, so the system selects associated music.

In another embodiment, a user may opt to join a party started by a different host. The user (a second host) may opt to join a party initiated by a first host. The first host may start a party voting application, and make the party public, wherein other hosts or users may join. Alternatively, the party is a private party, wherein new or additional hosts need to be approved by the original host. Approval is presented to the first user, and after receiving approval, the system includes the additional host. Alternatively, if the system does not receive approval, the additional host is not invited to the party.

In still yet another embodiment, more than one user may be pre-registered as voters, and the system chooses a seed track representative of those users based on their taste profile, which is associated with their user ID. The application uses user taste profiles to choose a seed track that all pre-registered voters would enjoy.

In some embodiments, if the selected track is located too far away in the vector space from the seed song the selected track is removed. A threshold value may be determined, and if the Cosine distance between the seed track and the selected track is below the threshold, that selected track is not placed in the queue or played.

Figure 4:
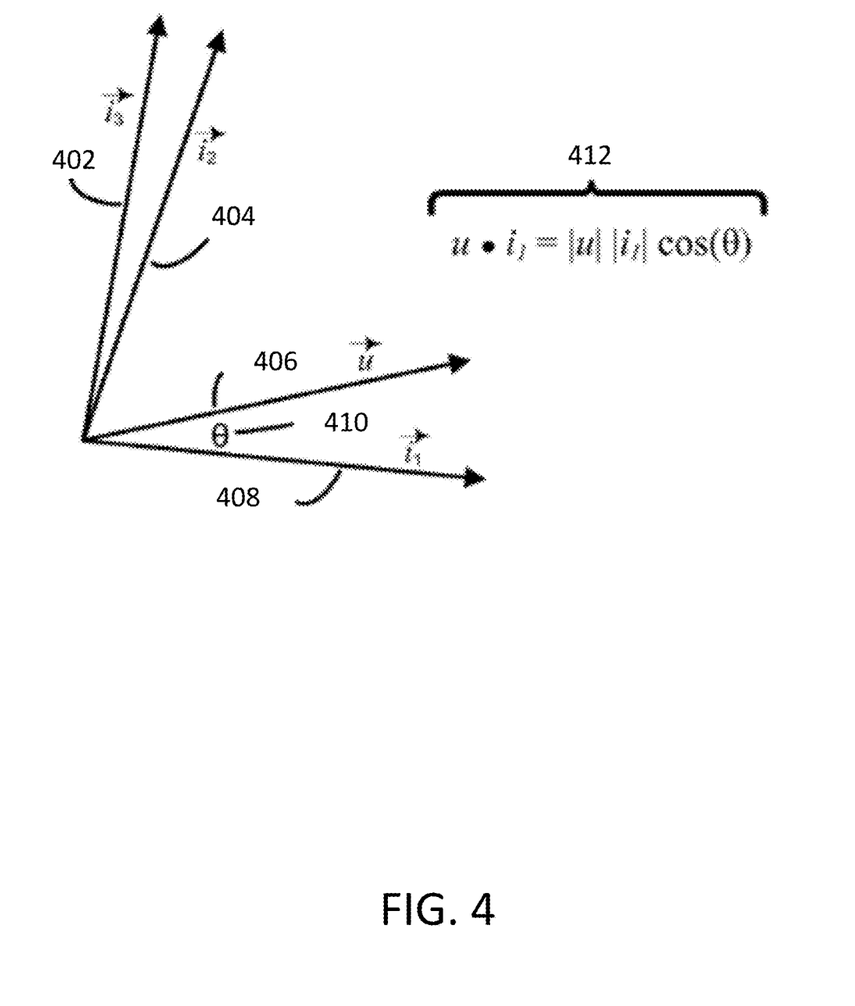
FIG. 4 illustrates geometrically seed track and related track vectors, and the angles between them in accordance with some implementations.

FIG. 4 illustrates geometrically a seed track vector 406, and three related track vectors 402, 404, and 408. Although depicted here in two dimensions, the vectors may have any number of components (e.g., 20 dimensions, 40 dimensions, or 100 dimensions). In FIG. 4, the angle between the seed track vector 406 and related track vector $i_1$ is θ 410. As known in the art, the inner product (or dot product) of two vectors is the product of their lengths times the cosine of the angle between the vectors, as illustrated in the formula 412. Assuming $i_1$, $i_2$, and $i_3$ in FIG. 4 are related track vectors corresponding to media content items, the media content items most similar to each other are $i_2$, and $i_3$ because they are the closest together. If a user likes item $i_2$, then there is a reasonable chance the user will also like $i_3$, but interest in $i_1$, is less likely.

FIG. 5 illustrates an example user interface 500 of the "Party Voting" application described herein. The user interface 500 may be projected where an event is occurring. The user interface 500 may also be presented on a voter's mobile device, such as a webpage or a media streaming application.

At the top, a currently playing track 510 is shown. At the beginning of the event, the currently playing track 510 may also be the seed track. Related art may be used as an illustration 520 to visualize which track is playing. Related art may be album art from the album.

A plurality of related tracks 514a, 514b, 514c is shown. The plurality of related tracks 514a, 514b, 514c are shown on the user interface 500 as the tracks that voters can vote for. The plurality of related tracks 514a, 514b, 514c are also provided with an identifier 518. The identifier 518 is used when voting as a shorter way to identify the tracks. In an example, a voter calls or texts the number 512 provided. The number 512 is associated with a specific party. If the voter calls, they are prompted to enter their vote as a number or vocalize the assigned number or name of the song. If the voter texts, they are prompted to text the identifier 518. Alternatively, the voter may vocalize or text the actual name of the track.

An alternative method of voting includes going to a website and entering a code 516. The code 516 is associated with a particular party. After entering the code 516, the voter is prompted to enter their selection. The website may have the same user interface 500, or may have a different user interface that includes the plurality of related tracks 514. A voter may select which track they want to vote for, or the voter may enter the identifier 518.

In yet another method of voting, a quick response (QR) code (not shown) is on the user interface 500. The QR code is associated with a particular party. The QR code may bring the user to the website, where the plurality of related tracks 514a, 514b, 514c are shown for voting. The website may have the same user interface 500, or may have a different user interface that includes the plurality of related tracks 514a, 514b, 514c. A voter may select which track they want to vote for, or the voter may enter the identifier 518.

After a voter has viewed the website, it will update as the currently playing track 510 and the plurality of related tracks 514a, 514b, 514c changes. The voter may not have to enter the website or scan the QR code each time they want to vote.

Figure 6:
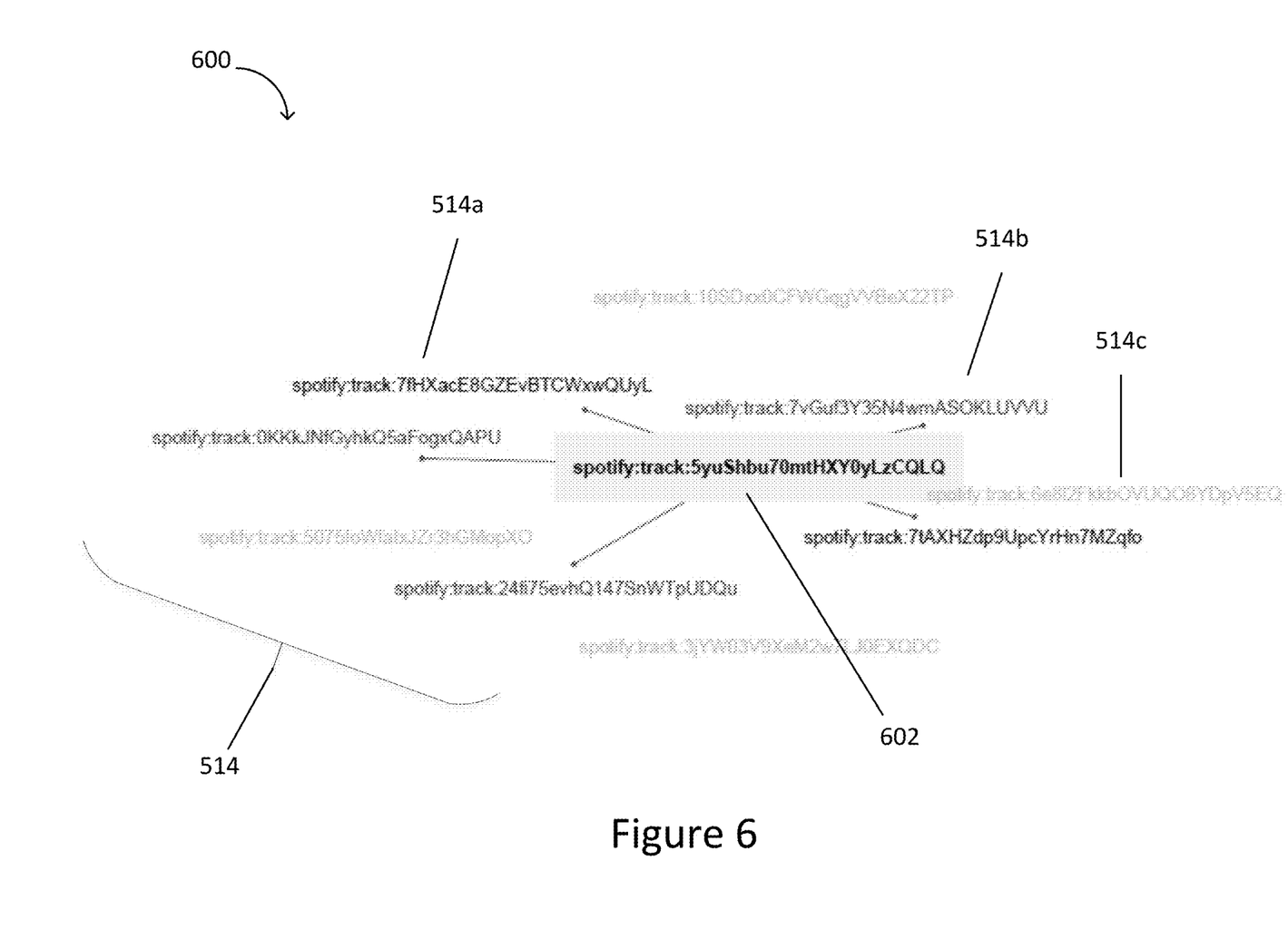
FIG. 6 illustrates an embodiment of tracks arranged by cosine distance.

FIG. 6 illustrates an example vector space 600 with tracks arranged by cosine distance. Tracks that are closely arranged have a high cosine value. The process begins with a seed track 602. The seed track 602 is selected by the host or by the system. After the seed track 602 has been identified, the related tracks 514 are identified. Related tracks include tracks that are related to the seed track 602 in a variety of ways. Related tracks 514 may be tracks that are in the same playlist, same album, same genre, etc., as the seed track 602 (or currently playing track, as the plurality of tracks selected is dynamic).

The related tracks are arranged in a vector space 600. A further-away track represents a track that has a lower amount of similarity to the seed track 602, and receives a lower similarity score. Likewise, a closely located track represents a track that has a high level of similarity to the seed track 602, and receives a high similarity score. Similarity includes the same artist, same genre, tracks that generally show up in the same playlists by users, etc, and quantify how well a user will like a second track based on their affinity for the first track. The similarity score may be calculated using a cosine similarity function.

In another embodiment, the vector space of FIG. 6, is created by an automated system that clusters tracks into a space by collecting playlist data and similarities across playlists that include the same tracks. The clustering may be done, for example, by calculating the pairwise cosine distance between two vectors among the plurality of vector representations. If the pairwise cosine distance is below a threshold value, the two vectors are merged into a cluster. The two vectors are removed from the plurality of vector representations and a cluster vector representation of the two vectors is calculated, for example, as the mean of all vectors in the cluster. The cluster vector representation is reinserted into the plurality of vector representations and the clustering heuristic is repeated until a desired number of clusters is achieved.

In the first round of voting the currently playing track is the seed track 602. Thereinafter, the seed track 602 is the currently playing track, which has previously been selected by the voters.

Tracks that are most closely related to the seed track 602 are displayed on the user interface 500 as tracks that voters can choose from. For example, tracks 514a, 514b, 514c are the tracks presented to voters.

In an embodiment, the vector space 600 is also used as a way of overriding tracks that have a high amount of votes, but are not related to the seed track 602 or currently playing track. For example, if a track 514 is a disco song that receives a large amount of votes, but the currently playing track is a rap song (and the previously played songs are rap songs), the system would not play the disco track, and instead move to the song with the next highest amount of votes.

For example, an affinity score may be calculated and used to determine if two tracks are related. An affinity score is a value or set of values (e.g., represented as a vector) that quantifies a relationship between the seed song and the songs selected by the voters. A relatively high affinity score corresponds to two songs that are highly related in terms of genre, style, etc., whereas a relatively low affinity score corresponds to two songs that are not very related. For example, if a song selected by voters has a low affinity score as compared to the seed track, then that song is deemed to be less related and is not played. Instead a song with a higher affinity score is played. In some embodiments, the affinity score is weighted more than the number of votes.

An affinity score may also be calculated as an aggregate of all the previously played tracks. The average affinity score may be used to determine if tracks to be presented for voting are related. Using an average affinity score can be used to increase the cohesiveness of all the played tracks. However, calculating an average affinity score is not necessary.

Figure 7:
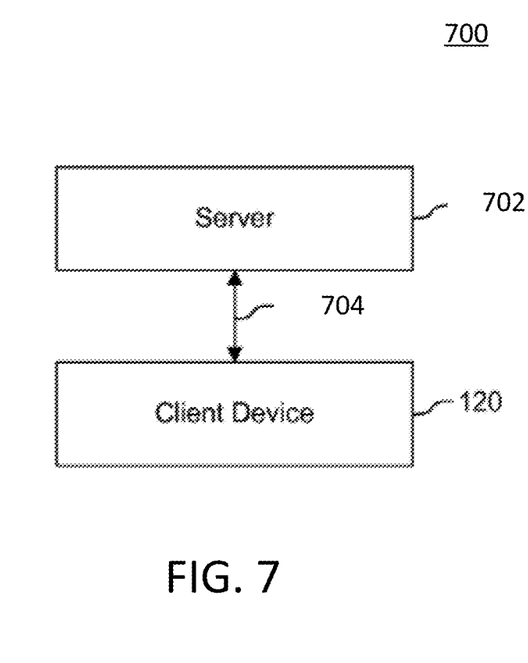
FIG. 7 is a block diagram of an example client-server data system according to an example embodiment.

FIG. 7 is a block diagram of an example client-server data system 700 configured in accordance with the principles of the invention. Data system 700 can include server 702 and client device 120. In some embodiments, data system 700 can include multiple servers 702, multiple client devices 120, or both multiple servers 702 and multiple client devices 120. For simplicity, only one server 702 and one client device 102 are illustrated.

Server 702 may include any suitable types of servers that can store and provide data to client device 102 (e.g., file server, database server, web server, distributed server, clustered servers, or a media server). Server 702 can store data, and server 702 can receive data download requests from client device 120.

In some embodiments, server 702 can obtain and process data from one or more client devices 120.

Server 702 can communicate with client device 102 over communications link 704. Communications link 704 can include any suitable wired or wireless communications link, or combinations thereof, by which data may be exchanged between server 702 and client device 120. For example, communications link 704 can include a satellite link, a fiber-optic link, a cable link, an Internet link, or any other suitable wired or wireless link. Communications link 704 may enable data transmission using any suitable communications protocol supported by the medium of communications link 704. Such communications protocols may include, for example, Wi-Fi (e.g., a 802.11 protocol), Ethernet, Bluetooth™, radio frequency systems (e.g., 900 MHz, 2.4 GHz, and 5.6 GHz communication systems), infrared, TCP/IP (e.g., and the protocols used in each of the TCP/IP layers), HTTP, BitTorrent, FTP, RTP, RTSP, SSH, any other communications protocol, or any combination thereof.

Client device 120 can include any electronic device capable of communicating and/or displaying or providing data to a user and may be operative to communicate with server 702. For example, client device 120 can include a portable media player, a cellular telephone, pocket-sized personal computers, a desktop computer, a laptop computer, a tablet, and any other device capable of communicating via wires or wirelessly (with or without the aid of a wireless enabling accessory device).

Figure 8:
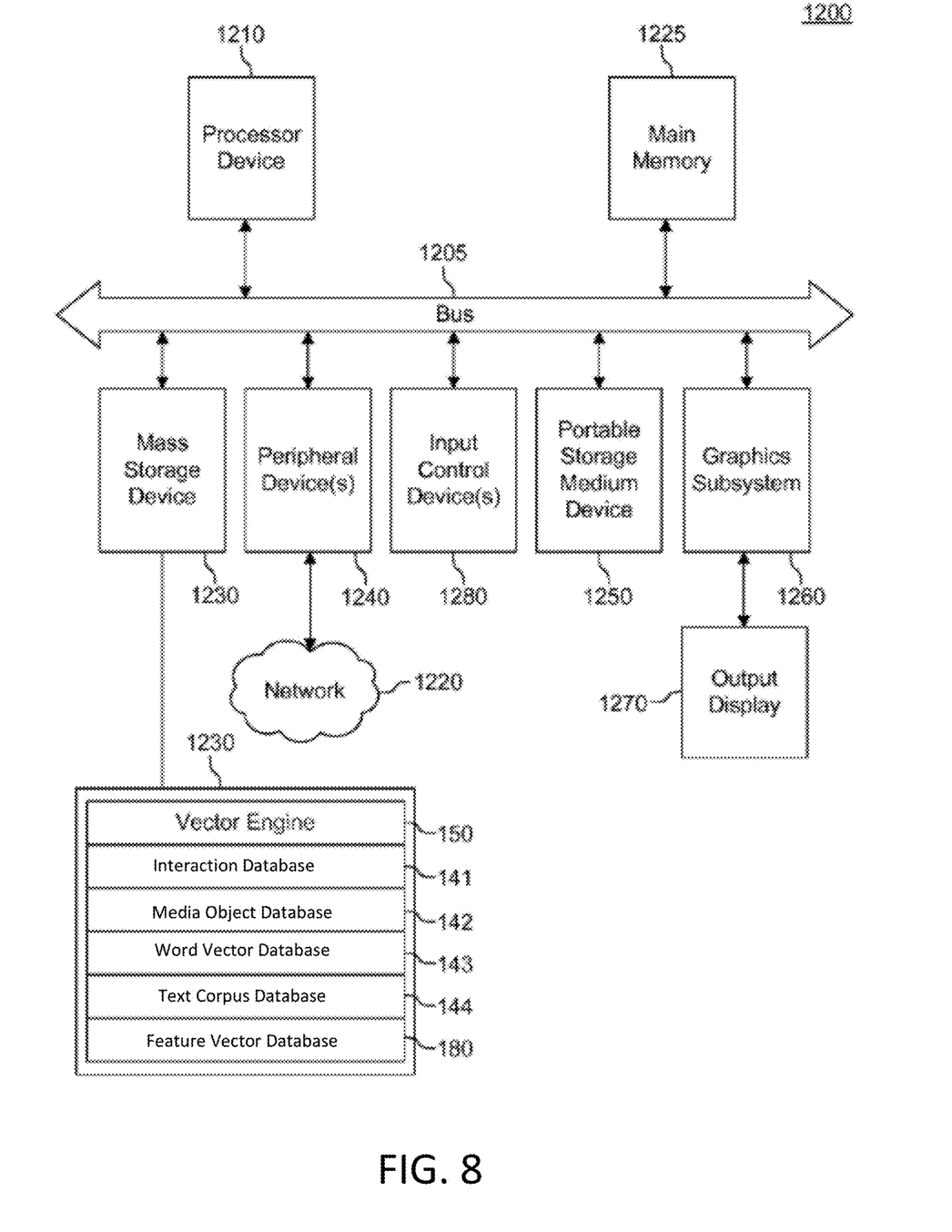
FIG. 8 is a block diagram of a special purpose server-side computer constructed to realize the server-side functionality of the example embodiments.

FIG. 8 is a block diagram of a special purpose server-side computer 1200 constructed to realize the server-side functionality of the example embodiments. Computer 1200 may include any of processor device 1210, main memory 1225, bus 1205, mass storage device 1230, peripheral devices 1240, input control devices 1280, portable storage medium device 1250, graphics subsystem 1260, and output display 1270.

The mass storage device 1220 of server-side computer 1200 stores vector engine 150. Additionally, mass storage device 1230 may optionally store interaction database 141, media object database 142, word vector database 143, text corpus database 144 or feature vector database 180 extracted from distributed data storage 140.

Computer 1200 might be incorporated in a stand-alone apparatus or in a multi-component apparatus, such as for grid computing in a cluster of servers or a distributed file system.

Each component of the client device 120 and computer 1200 may represent a broad category of a computer component of a general and/or special purpose computer. Components of the client device 120 and computer 1200 are not limited to the specific implementations provided herein.

Software embodiments of the example embodiments presented herein may be provided as a computer program product, or software, that may include an article of manufacture on a machine-accessible or machine-readable medium having instructions. The instructions on the non-transitory machine-accessible machine-readable or computer-readable medium may be used to program a computer system or other electronic device. The machine- or computer-readable medium may include, but is not limited to, floppy diskettes, optical disks, CD-ROMs, and magneto-optical disks or other types of media/machine-readable medium suitable for storing or transmitting electronic instructions. The techniques described herein are not limited to any particular software configuration. They may find applicability in any computing or processing environment. The terms "computer-readable", "machine-accessible medium" or "machine-readable medium" used herein shall include any medium that is capable of storing, encoding, or transmitting a sequence of instructions for execution by the machine and that causes the machine to perform any one of the methods described herein. Furthermore, it is common in the art to speak of software, in one form or another (e.g., program, procedure, process, application, module, unit, logic, and so on), as taking an action or causing a result. Such expressions are merely a shorthand way of stating that the execution of the software by a processing system causes the processor to perform an action to produce a result.

Portions of the example embodiments of the invention may be conveniently implemented by using a conventional general purpose computer, a specialized digital computer and/or a microprocessor programmed according to the teachings of the present disclosure, as is apparent to those skilled in the computer art. Appropriate software coding may readily be prepared by skilled programmers based on the teachings of the present disclosure.

Some embodiments may also be implemented by the preparation of application-specific integrated circuits, field-programmable gate arrays, or by interconnecting an appropriate network of conventional component circuits.

Some embodiments include a computer program product. The computer program product may be a storage medium or media having instructions stored thereon or therein which can be used to control, or cause, a computer to perform any of the procedures of the example embodiments of the invention. The storage medium may include without limitation a floppy disk, a mini disk, an optical disc, a Blu-ray Disc, a DVD, a CD or CD-ROM, a micro-drive, a magneto-optical disk, a ROM, a RAM, an EPROM, an EEPROM, a DRAM, a VRAM, a flash memory, a flash card, a magnetic card, an optical card, nanosystems, a molecular memory integrated circuit, a RAID, remote data storage/archive/warehousing, and/or any other type of device suitable for storing instructions and/or data.

Stored on any one of the computer-readable medium or media, some implementations include software for controlling both the hardware of the general and/or special computer or microprocessor, and for enabling the computer or microprocessor to interact with a human user or other mechanism utilizing the results of the example embodiments of the invention. Such software may include without limitation device drivers, operating systems, and user applications. Ultimately, such computer-readable media further include software for performing example aspects of the invention, as described above.

Included in the programming and/or software of the general and/or special purpose computer or microprocessor are software modules for implementing the procedures described above.

While various example embodiments of the present invention have been described above, it should be understood that they have been presented by way of example, and not limitation. It will be apparent to persons skilled in the relevant art(s) that various changes in form and detail can be made therein. Thus, the present invention should not be limited by any of the above described example embodiments, but should be defined only in accordance with the following claims and their equivalents. Further, the Abstract is not intended to be limiting as to the scope of the example embodiments presented herein in any way. It is also to be understood that the procedures recited in the claims need not be performed in the order presented.

The invention claimed is:

1. A method, comprising:
receiving a seed media content item;
determining a plurality of related media content items based at least on the seed media content item;
displaying, on at least one display, a plurality of selectable graphical images representing the plurality of related media content items, correspondingly;
receiving, from each of a plurality of devices, a communications message containing a vote corresponding to a media content item selected from the plurality of related media content items;
tallying a plurality of votes received from the plurality of devices;
selecting a predetermined number of media content items from the plurality of related media content items based on the plurality of tallied votes;
storing, at a media distribution platform, one or more of the predetermined number of media content items in a queue;
streaming at least one of the predetermined number of media content items in the queue on one or more media playback devices, the media content items being distributed by the media distribution platform storing the media content items;
determining an updated plurality of related media content items based on a currently streaming media content item; and
displaying, on at least one display, an updated plurality of selectable graphical images representing the updated plurality of related media content items for a next round of voting, wherein the plurality of media content items are prestored in a database.

2. The method according to claim 1, further comprising selecting from the queue one of the predetermined number of media content items to be a next seed media content item.

3. The method according to claim 1, further comprising selecting a next seed media content item based on two or more of the predetermined number of media content items.

4. The method according to claim 1, wherein the receiving from each of the plurality of devices, includes receiving at least one of: one vote, a plurality of votes, and a weighted vote.

5. The method according to claim 1, further comprising:
obtaining an affinity score for each of the predetermined number of media content items; and
filtering the predetermined number of media content items based on the affinity score.

6. The method according to claim 1, wherein determining the plurality of related media content items are selected by calculating a similarity score between the seed media content item and the plurality of related media content items.

7. The method of claim 6, wherein the similarity score is calculated using a Cosine similarity function.

8. The method according to claim 1, wherein the seed media content item is an audio track and the plurality of related media content items are selected from a plurality of audio tracks.

9. A system comprising a non-transitory memory and a processing device coupled to the memory and constructed to execute the process steps stored in the memory, wherein the stored process steps include steps which when executed by the processor cause the processor to perform the steps of:
receiving a seed media content item;
determining a plurality of related media content items based at least on the seed media content item;
displaying, on at least one display, a plurality of selectable graphical images representing the plurality of related media content items, correspondingly;
receiving, from each of a plurality of devices, a communications message containing a vote corresponding to a media content item selected from the plurality of related media content items;
tallying a plurality of votes received from the plurality of devices;
selecting a predetermined number of media content items from the plurality of related media content items based on the plurality of tallied votes;
storing, at a media distribution platform, one or more of the predetermined number of media content items in a queue;
streaming at least one of the predetermined number of media content items in the queue on one or more media playback devices, the media content items being distributed by the media distribution platform storing the media content items;
determining an updated plurality of related media content items based on a currently streaming media content item; and
displaying, on at least one display, an updated plurality of selectable graphical images representing the updated plurality of related media content items for a next round of voting, wherein the plurality of media content items are prestored in a database.

10. The system according to claim 9, further comprising selecting from the queue one of the predetermined number of media content items to be a next seed media content item.

11. The system according to claim 9, further comprising selecting a next seed media content item based on two or more of the predetermined number of media content items.

12. The system according to claim 9, wherein the receiving from each of the plurality of devices, includes receiving at least one of: one vote, a plurality of votes, and a weighted vote.

13. The system according to claim 9, further comprising:
obtaining an affinity score for each of the predetermined number of media content items; and
filtering the predetermined number of media content items based on the affinity score.

14. The system according to claim 9, wherein determining the plurality of related media content items are selected by calculating a similarity score between the seed media content item and the plurality of related media content items.

15. The system according to claim 14, wherein the similarity score is calculated using a Cosine similarity function.

* * * * *